United States Patent
Ebeling

[15] 3,649,980
[45] Mar. 21, 1972

[54] DIRECT DRIVE CAR WINDOW BRUSHING UNIT

[72] Inventor: Jack F. Ebeling, Portland, Oreg.
[73] Assignee: Daniel C. Hanna, Portland, Oreg.
[22] Filed: Oct. 27, 1969
[21] Appl. No.: 869,841

[52] U.S. Cl. ..............................15/21 D, 15/DIG. 2, 15/182
[51] Int. Cl. .........................................................B60s 3/06
[58] Field of Search....................15/DIG. 2, 21 R, 21 D, 21 E, 15/23, 53, 97

[56] References Cited

UNITED STATES PATENTS 3,113,332  12/1963  Kasper......................................15/82
3,523,320  8/1970  Williams................................15/21 D Primary Examiner—Edward L. Roberts
Attorney—Buckhorn, Blore, Klarquist and Sparkman

[57] ABSTRACT

Brushes having hollow cores fit over and enclose motors mounted on the end of an arm biased toward a car and downwardly. The cores are connected by hubs to the shafts of the motors.

6 Claims, 7 Drawing Figures

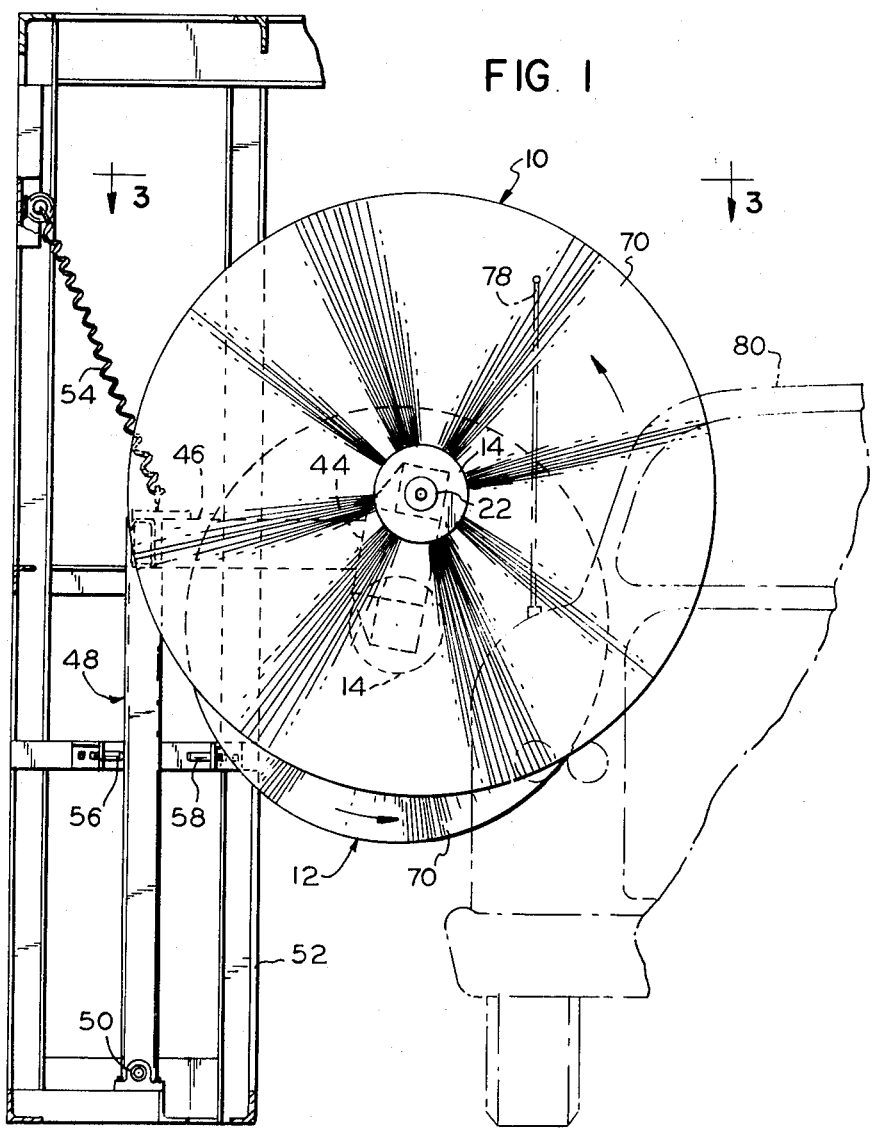
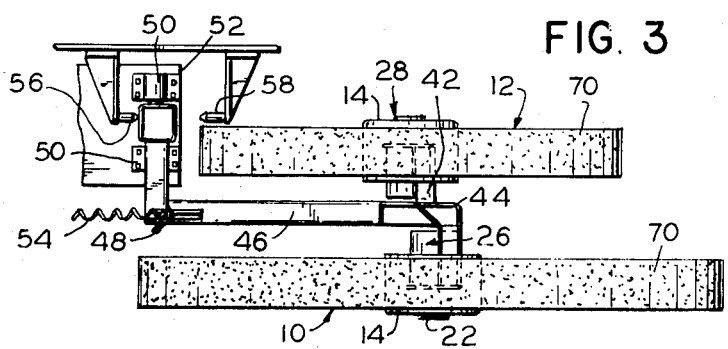

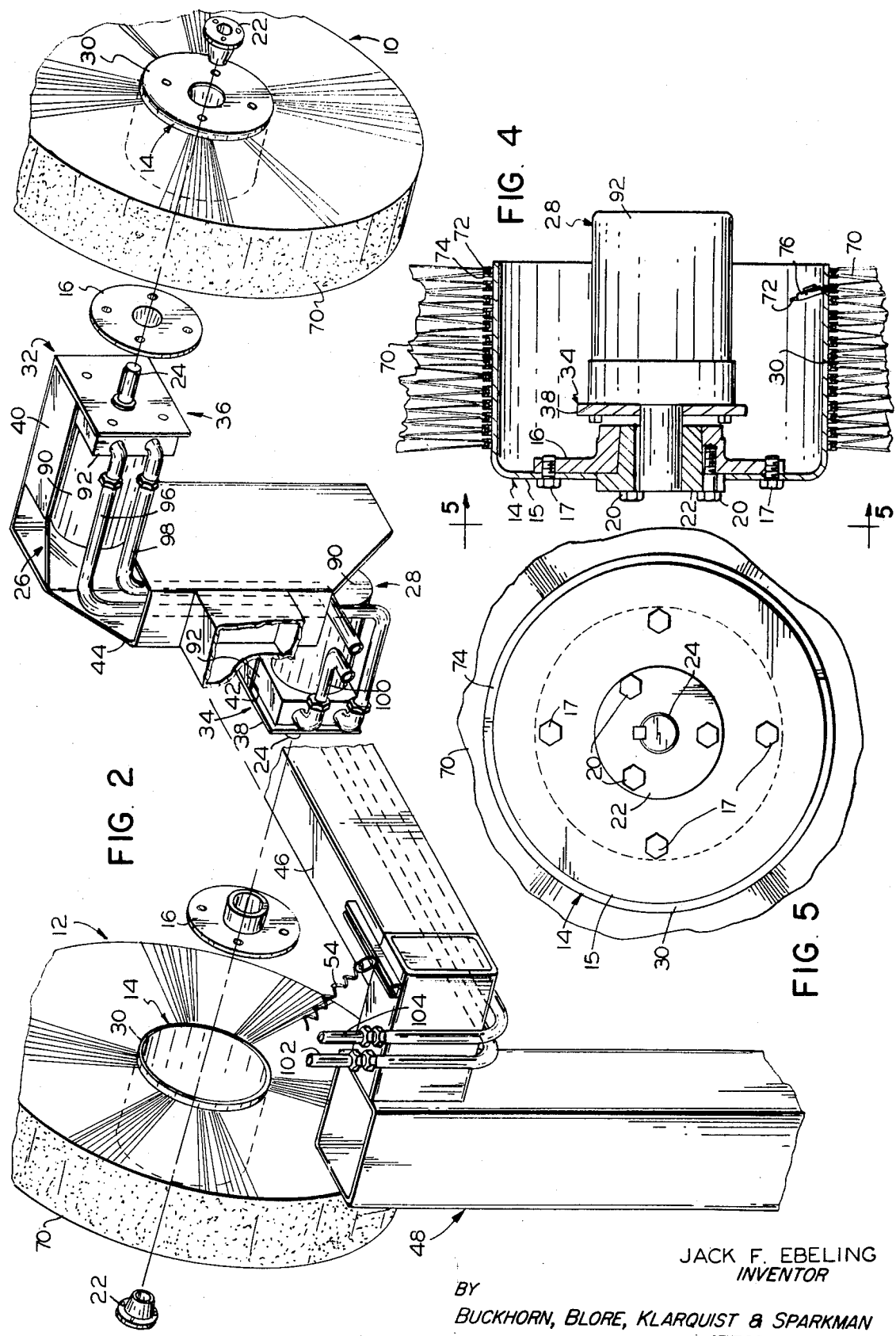

JACK F. EBELING
INVENTOR

BY
BUCKHORN, BLORE, KLARQUIST & SPARKMAN
ATTORNEYS

DIRECT DRIVE CAR WINDOW BRUSHING UNIT

DESCRIPTION

This invention relates to a direct drive car window brushing unit, and more particularly to a compact direct drive car window brushing unit.

Car window brushing units known in the past have required drive trains which involve expense and extensive maintenance. It would be desirable to provide a direct drive from the motor to the brush but with designs known hitherto, such drives have been too bulky.

An object of the invention is to provide a direct drive car window brushing unit.

Another object of the invention is to provide a compact direct drive car window brushing unit.

A further object of the invention is to provide a brushing unit in which a hollow core of a brush telescopes over a motor and is mounted on a drive shaft of the motor.

Another object of the invention is to provide a car window brushing unit in which motors mounted on a carrier support brushes telescopically thereon.

The invention provides a brush unit in which a brush having a hollow core is mounted on a drive shaft of an end mounted motor and encloses the motor. In a brush unit forming a specific embodiment of the invention, motors are end-mounted on opposite sides of an L-shaped pivotal arm biased toward and downwardly from the path of one side window and sill area of a car. Brushes include bristles mounted in spirals on tubular, can-like cores which are mounted on the shafts of the motors, and cylindrical, drum portions of the cores extend over the motors to substantially fully enclose the motors.

In the drawings:

FIG. 1 is a fragmentary, front elevation of a direct drive car window brushing unit forming one embodiment of the invention;

FIG. 2 is an exploded perspective view of the brushing unit of FIG. 1;

FIG. 3 is a fragmentary top plan view of the brushing unit of FIG. 1;

FIG. 4 is a sectional view of the brushing unit of FIG. 1;

FIG. 5 is a vertical sectional view taken along line 5—5 of FIG. 4;

Figure 6:
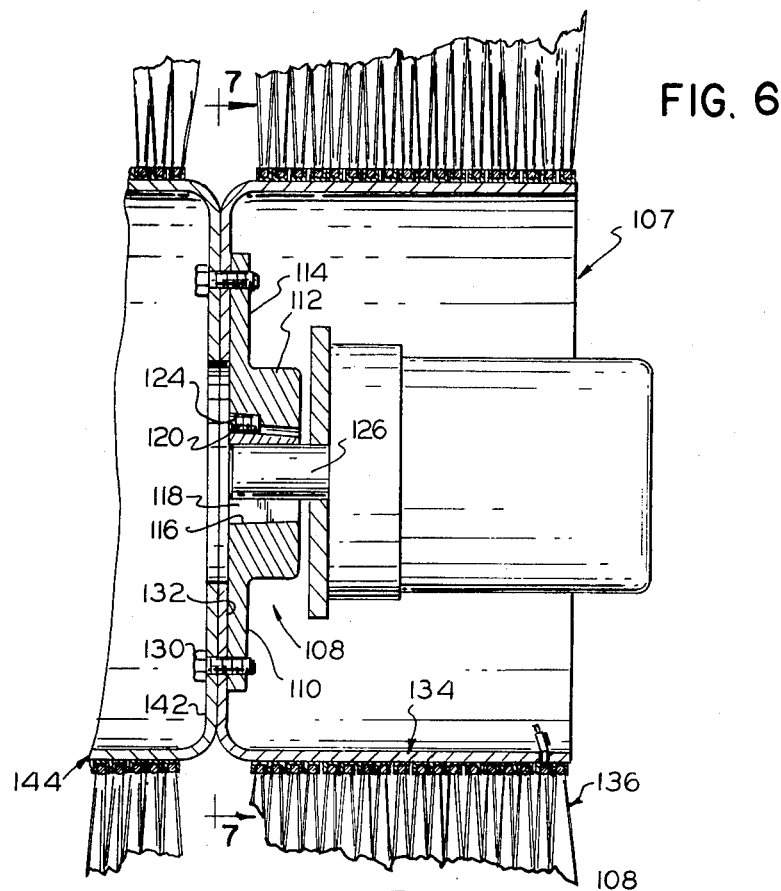
FIG. 6 is a fragmentary vertical sectional view of a direct drive car window brushing unit forming an alternate embodiment of the invention.

Referring now in detail to the drawings, there is shown in FIGS. 1–5 a direct drive car window brushing unit forming one embodiment of the invention and including brushes 10 and 12 having tubular or hollow, cup-like cores 14 having ends 15 bolted by screws 17 to internally tapered hub plates 16 wedged by bolts 20 onto externally tapered hubs 22 keyed to and locked to shafts 24 of end mounted hydraulic motors 26 and 28. Cylindrical drum portions 30 of the cores telescopically, radially enclose the motor mounts 32 and 34, which include outboard mounting plates 36 and 38 supported by angles 40 and 42, respectively, secured to a hollow cross arm 44 welded to outer end portion 46 of an L-shaped carrier arm 48 pivotally mounted by bearings 50 in a stanchion 52 of an arch of a car wash. A spring 54 counterbalances somewhat gravity bias of the arm 48, which gravity bias is in a clockwise direction, as viewed in FIG. 1. Stops 56 and 58 limit movement of the arm.

Bristles 70 (FIG. 4) are secured in looped tufts by a cable 72 and a paralleling channel 74 arranged in a helix on the exterior of each drum portion 30 of the hubs 14. Cable anchors 76 on the ends of the cables secure the cables to the drum portions in taut condition. The cables are so spiralled as the brushes are rotated by the motor in the directions shown in FIG. 1, that the bristles tend to thread projections, such as, for example, an aerial 78 of a car 80 being driven forwardly past the brushes.

The motors 26 and 28, as disclosed, are of the hydraulic type but may, of course, be electrical if so desired. Each motor includes a housing 90 carried by a valving or distribution and bearing block 92 which is bolted to the plate 36 or 38 and has an internal bearing journaling the impeller (not shown) and shaft 24. Conduits 96, 98 and 100 supply liquid under pressure to the motors and exhaust the motors, flexible conduits 102 and 104 leading to a known source of liquid under pressure and a reservoir (not shown).

If desired, second brushes like the brushes 10 and 12 but respectively of opposite bristle spiralling may be bolted to the end plates 16 of the brushes 10 and 12 to form double brushes with each brush 10 and 12. It will be appreciated that a second brushing unit like that described above, but handed or allochiral, is mounted on the opposite side of the path of the car to clean the other side windows and sill areas of the car.

EMBODIMENT OF FIGS. 6 AND 7

Figure 7:
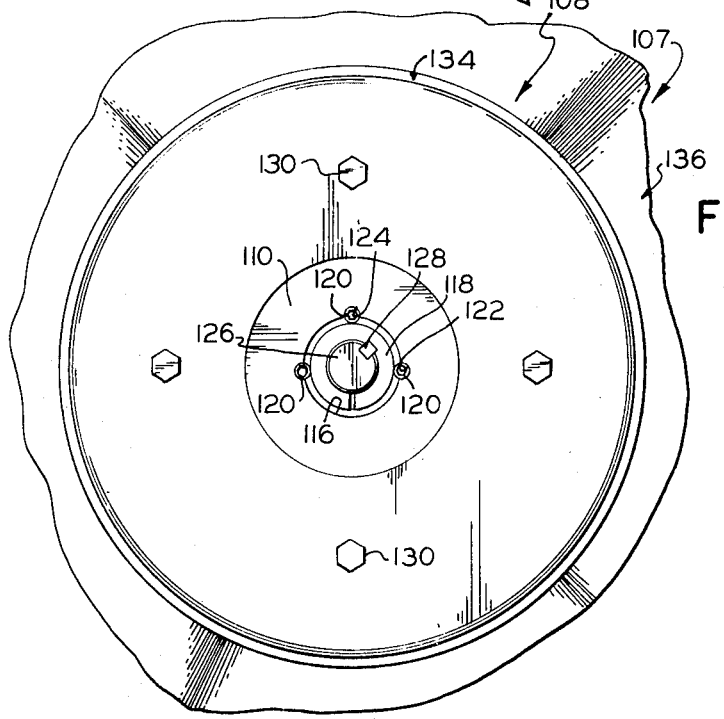
FIG. 7 is a vertical sectional view taken along line 7—7 of FIG. 6.

A direct drive side window brushing unit 107 forming an alternate embodiment of the invention shown in FIGS. 6 and 7 is like that described above and shown in FIGS. 1–5, except for a different hub structure 108. The hub structure 108 includes a hub plate 110 having a hub portion 112 and a disc portion 114. The hub portion 112 has a tapered bore 116 therethrough and fits on a tapered split hub 118. Screws 120 thread into tapped semibores 122 and 124 to clamp the hub on motor shaft 126, and key 128 keys the hub to the shaft, capscrews 130 clamp to the disc portion 114 end disc 132 of core 134 of brush 136, which is identical to brush 10. The capscrews also clamp tightly to the end disc 132 and end disc 142 of hub 144 of brush 146, which is identical to the brush 12.

What is claimed is:

1. In a direct drive car brushing unit,
movable carrier means including an arm and a mounting plate extending transversely from the arm,
motor means having a housing and an output shaft journaled in the housing,
the housing having a shaft end,
means bolting the shaft end of the housing to the mounting plate in a position in which the arm extends along one side of the motor and the shaft extends through and beyond the mounting plate,
a brush having a hollow core and extending over the motor means and partially over the arm,
and means coupling the core to the portion of the shaft beyond the mounting plate and constituting the entire support for the core.

2. The brushing unit of claim 1 wherein the hollow core is cup-shaped and the cupped end portion of the core is keyed to the shaft.

3. The brushing unit of claim 2 wherein the hollow core includes a disclike end portion,
the coupling means including a disclike coupling member bolted to the disclike end portion and keyed to the shaft.

4. The brushing unit of claim 2 including a second brush having a hollow cup-shaped core bolted to the first-mentioned core in an axially aligned position relative to the first mentioned core.

5. The brushing unit of claim 1 wherein the coupling means includes an internally tapered hub plate carrying the core, an externally tapered hub keyed to the core, and means wedging the hub plate on the hub.

6. In a direct drive car washing unit,
motor means having a housing and a drive shaft,
carrier means mounting the housing,
a first brush having a first cup-shaped core extending over the motor means and fixed to and supported by the drive shaft,
and a second brush having a second cup-shaped core secured to the first cup-shaped core in end to end relationship.

* * * * *